United States Patent
Revis

(10) Patent No.: US 6,359,775 B1
(45) Date of Patent: Mar. 19, 2002

(54) ACCESSIBLE DESKTOP COMPUTER

(75) Inventor: Paul A. Revis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/371,924

(22) Filed: Aug. 11, 1999

(51) Int. Cl.$^7$ ................................................ G06F 1/16
(52) U.S. Cl. ...................... 361/683; 361/384; 361/680; 361/681; 361/682; 361/684; 361/685; 361/686; 361/724; 361/725; 361/726; 361/753; 361/759; 361/780; 361/796; 361/797; 361/801; 361/802; 248/916; 248/917; 312/302; 312/236; 312/257 A; 312/257 SM; 312/319; 312/320; 364/708.1; 359/83
(58) Field of Search .................. 361/384, 680–686, 361/724–726, 753, 759, 780, 750, 796, 797, 801, 802; 248/917; 312/302, 236, 257 A, 257 SM, 319, 320; 211/41.17; 364/708.1; 359/83

(56) References Cited

U.S. PATENT DOCUMENTS

| | | | |
|---|---|---|---|
| 4,688,131 A | 8/1987 | Noda et al. | |
| 4,728,160 A | * 3/1988 | Mondor et al. | ............. 312/236 |
| 5,032,952 A | 7/1991 | Cooke et al. | ............... 361/392 |
| 5,136,466 A | 8/1992 | Remise et al. | |
| 5,351,176 A | * 9/1994 | Smith et al. | ................. 361/681 |
| 5,452,950 A | * 9/1995 | Crenshaw et al. | ........ 312/223.3 |
| 5,495,389 A | 2/1996 | Dewitt et al. | ................ 361/683 |
| 5,555,489 A | 9/1996 | Keskinen | ..................... 361/683 |
| 5,570,267 A | * 10/1996 | Ma | ............................ 361/681 |
| 5,680,293 A | 10/1997 | McAnally et al. | |
| 5,684,671 A | 11/1997 | Hobbs et al. | ................ 361/683 |
| 5,701,231 A | 12/1997 | Do et al. | ..................... 361/683 |
| 5,713,647 A | 2/1998 | Kim | ......................... 312/223.2 |
| 5,743,606 A | 4/1998 | Scholder | .................. 312/223.2 |
| 5,751,548 A | * 5/1998 | Hall et al. | ................... 361/686 |
| 5,761,034 A | 6/1998 | Chu | ........................... 361/687 |
| 5,777,848 A | 7/1998 | McAnally et al. | .......... 361/725 |
| 5,784,251 A | * 7/1998 | Miller et al. | ................ 361/683 |
| 5,896,273 A | 4/1999 | Varghese et al. | |
| 6,181,565 B1 | * 1/2001 | Schmitt et al. | ............. 361/756 |

* cited by examiner

Primary Examiner—Leo P. Picard
Assistant Examiner—Yean-Hsi Chang
(74) Attorney, Agent, or Firm—Perkins Coie LLP

(57) ABSTRACT

A computer is disclosed having a flat panel display device and a disk drive unit, each pivotable between a closed position wherein they serve as covers for the housing of the computer, and an open position, wherein access is provided to the internal components of the computer, including a motherboard and drive assemblies housed in the disk drive unit.

59 Claims, 4 Drawing Sheets

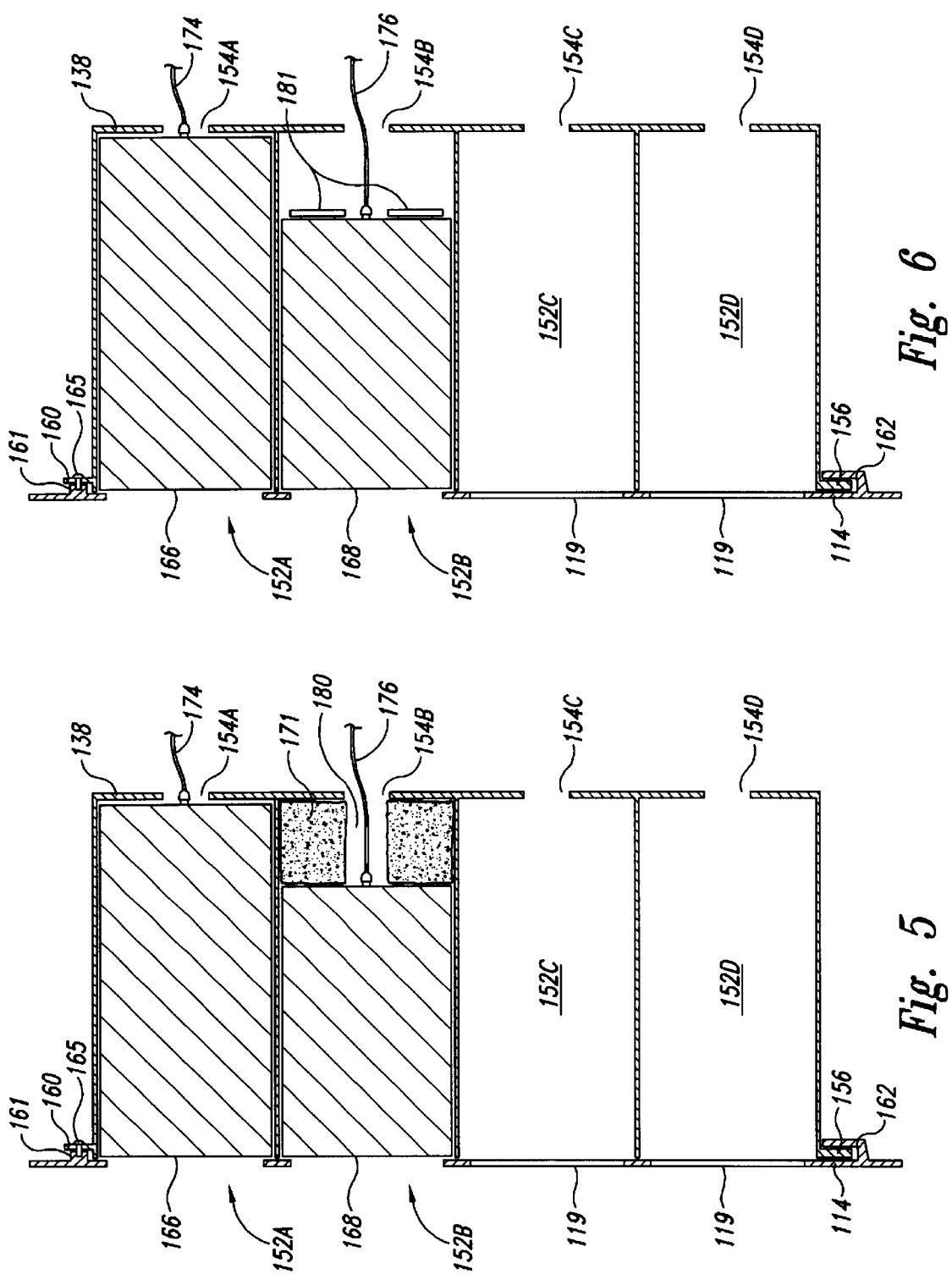

ACCESSIBLE DESKTOP COMPUTER

FIELD OF THE INVENTION

This invention concerns a small computer such as used as a personal computer or network workstation. More particularly, the invention concerns the configuration of the operational components, chassis, and housing of such a computer.

BACKGROUND OF THE INVENTION

Small computers are in wide use today. They inexpensively provide independent computing to individuals and small businesses, and when networked, serve the computing needs of large organizations.

Most small computers today are of the same general industrial design. They consist of a system unit, sometimes called a tower or desk top unit or simply the "computer." The system unit is basically a box-like housing containing a single central processing unit (CPU), volatile and nonvolatile memory, one or more storage drives such as flexible disk drives and CD-ROM, a power unit, a fixed disk storage hard drive, and a motherboard and harness for tying those, and the computer's peripheral components, together. Peripheral components include the necessary monitor, typically a cathode ray tube (CRT), a keyboard, and a mouse. Other peripherals include printers, modems, game input/output devices, and the like.

Typically, users place the system unit on their desk top, either next to or under their monitor, or next to or under their desk. Keyboards are placed on the desk or in a tray under it. Space for a mousepad is needed near the keyboard, and printers are placed nearby on the desk or a stand-alone unit. The system unit and all of the peripherals are tied together with multiple cables.

As the capabilities of, and resulting demand for, small computers grew, manufacturers initially focused on increasing computing power. However, users are increasingly focusing on the amount of desk space consumed by a small computer, as well as the need for separate computing elements tied together by a "rat's nest" of cabling, most of it inaccessible at the back of a computer. With upgrade of computers in power, memory, peripheral compatibility and application now routinely accomplished with add-on units such as CPU-chips, memory cards, and various other daughter cards, better access to the internal parts of the computer is also demanded. Consequently, what is required is a compact, consolidated, and accessible personal computer.

SUMMARY OF THE INVENTION

The present invention fills the need for a compact, consolidated, and accessible personal computer. The invention includes a computer with a housing and a flat panel display device, such as a liquid crystal display (LCD), active matrix display, plasma display, or other flat panel display device, pivotably connected by a hinge to the housing and rotatable about its horizontal axis between a closed position, wherein it serves as a cover for the internal components of the computer, and an open position, where it provides access to the internal components. The display extends past at least one wall of the housing, concealing cable connectors located on that wall.

The computer also has a drive unit pivotably connected by a hinge to the housing and rotatable about its vertical axis between a closed position, wherein it also serves as a cover for the internal components of the computer, and an open position, wherein it provides access to the internal components. The drive unit has a front panel and a detachable carriage for housing a plurality of drive assemblies, such as CD-ROM or mini-disk drives.

The above and other advantages and features of the invention will be more readily understood from the following detailed description of the invention which is provided in connection with the accompanying drawings.

BRIEF DESCRIPTION OF THE DRAWINGS

FIG. 5 is a sectional elevation of the drive carriage.

FIG. 6 is a sectional elevation of an alternative drive carriage.

DETAILED DESCRIPTION OF THE INVENTION

Figure 1:
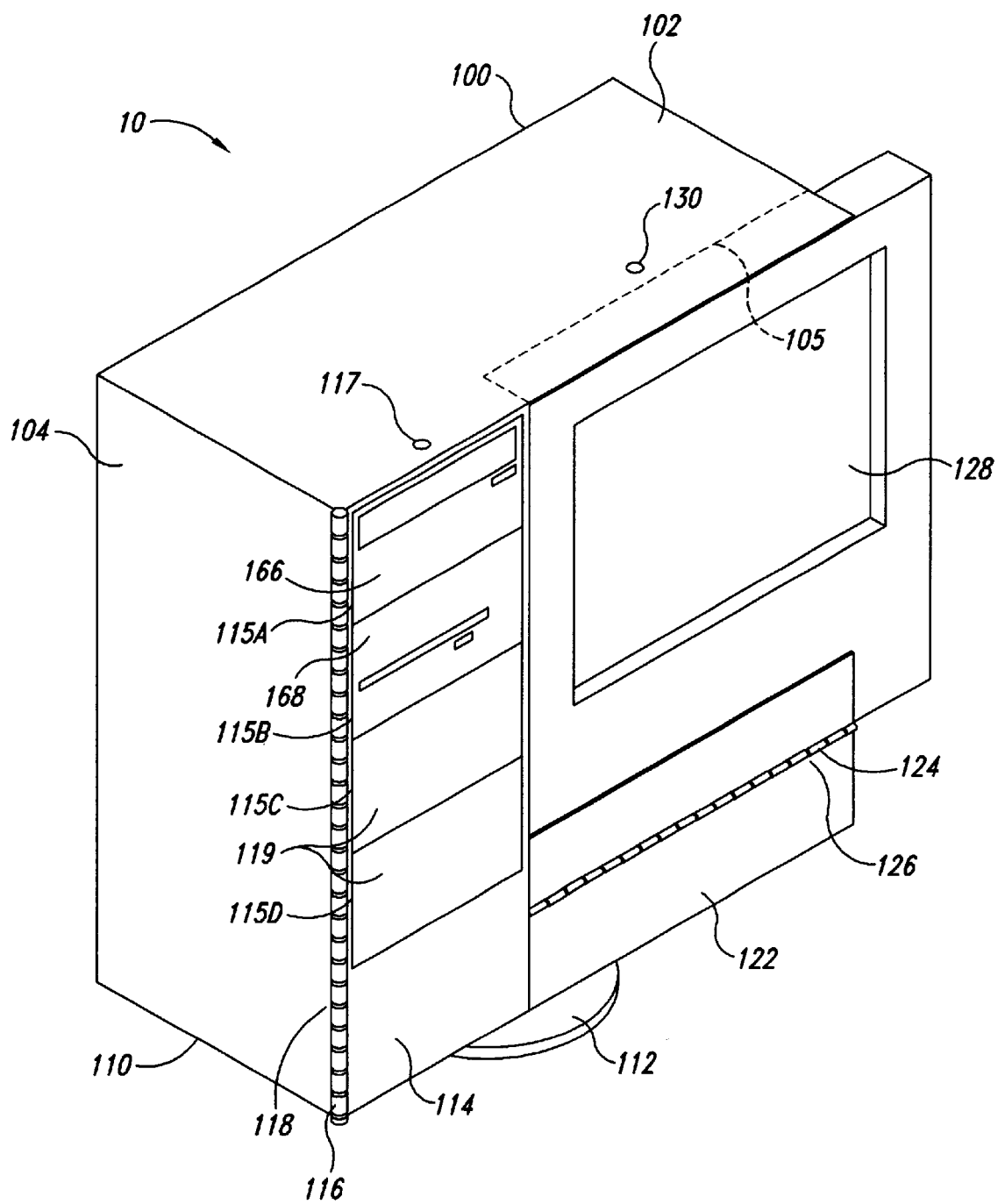
FIG. 1 is a front perspective view of an embodiment of a desktop computer constructed in accordance with the invention.
Figure 2:
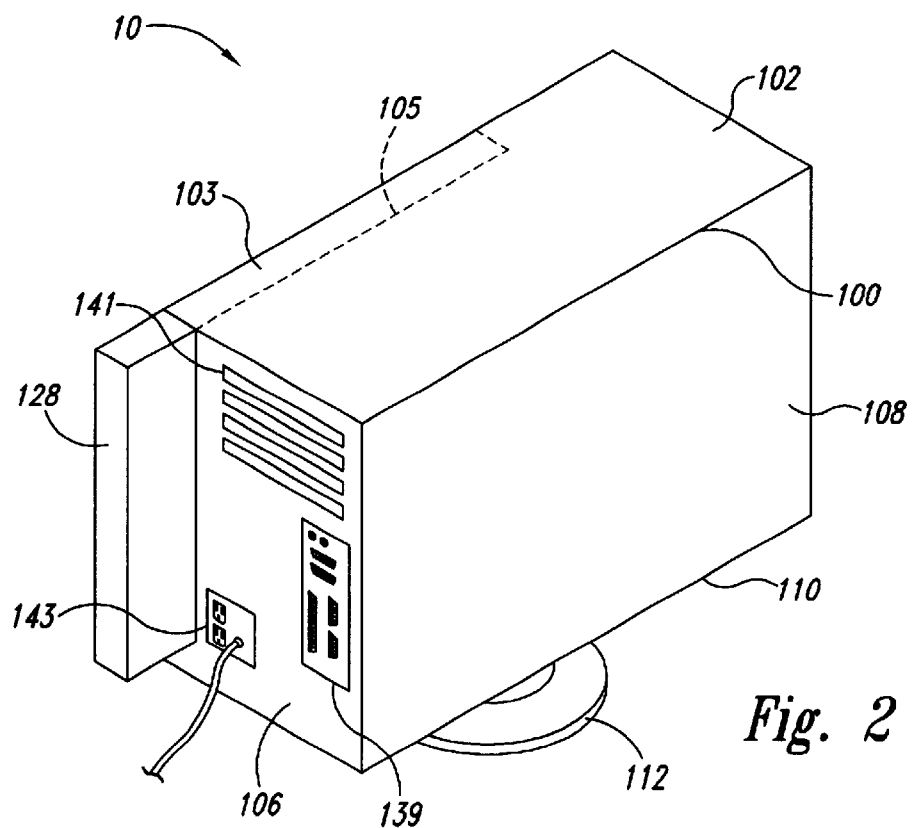
FIG. 2 is a rear perspective view of the FIG. 1 desktop computer.
Figure 3:
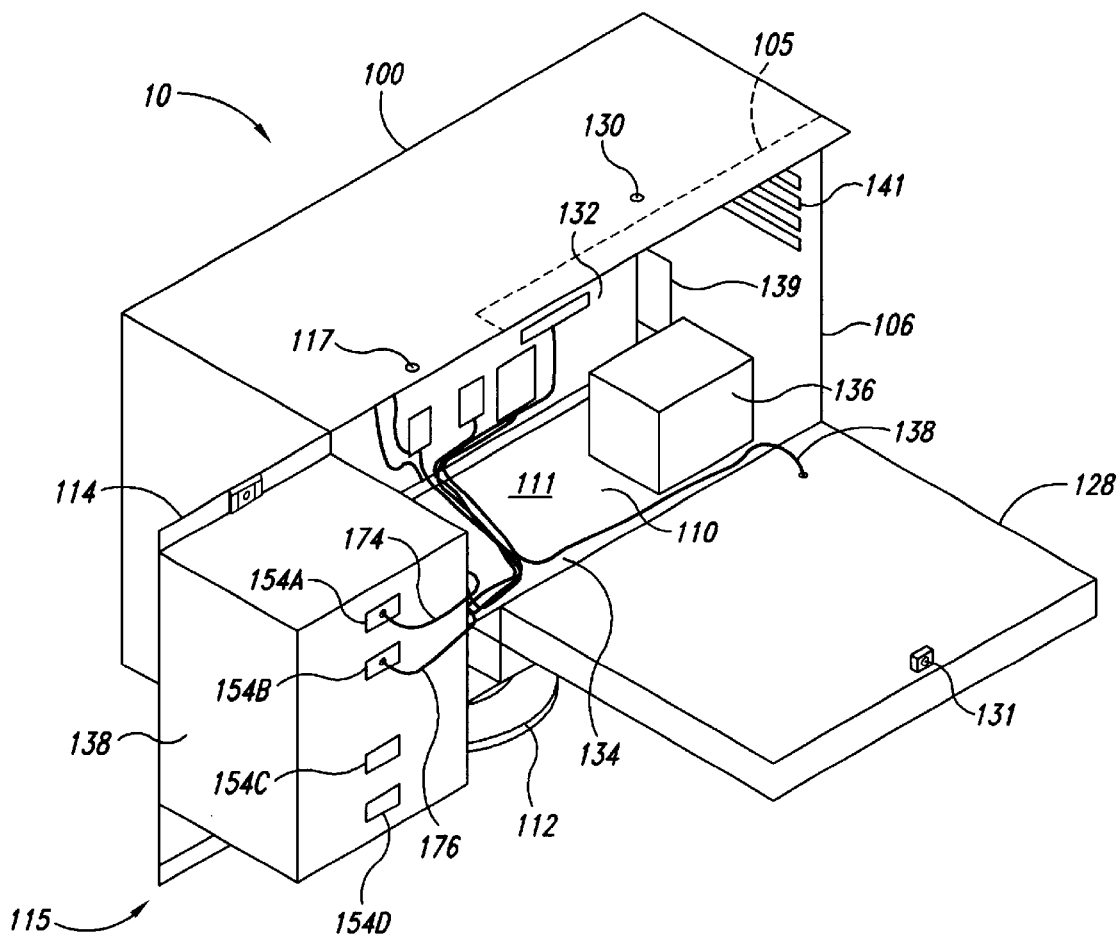
FIG. 3 is a front perspective view of the FIG. 1 desktop computer with a drive panel and flat panel display in open positions.

The compact, consolidated, and accessible personal computer of the invention is illustrated in FIGS. 1 and 2. In this embodiment, a system unit 10 consists of a box-like housing 100 having a rectangular top panel 102, rectangular left panel 104, rectangular right panel 106, rectangular back panel 108, and rectangular bottom panel 110. Preferably, the box shaped housing 100 is an integral unit molded of synthetic resin or the like and incorporating reinforcements, bosses, etc., as is well known in the art. One or more of panels 102, 104, 106, 108, 110 may incorporate grilles and other openings as required for the cooling or other operations of the computer. As shown in FIG. 3, the system unit 10 includes a motherboard 132, located on back panel 108, harness 134, power supply 136, and such other computer components as are well known in the art. Alternatively, motherboard 132 may be located on other surfaces, such as bottom panel 110.

The housing 100 is supported on a ball joint pedestal mount 112 that allows infinite adjustment of the position of the housing 100 through 360° about the housing's vertical axis and limited tilting of the housing 100. The pedestal mount 112 may employ friction to lock it in place or a separate locking mechanism. Such pedestal mounts are well known in the art.

A rectangular drive panel 114 is connected to, and rotates about, a piano hinge 116 located on the exposed edge 118 of left panel 104. Together, drive panel 114 and drive carriage 138 constitute drive unit 115 as set forth in more detail below. Alternatively, drive unit 115 could be horizontally hinged to upper panel 102 or lower panel 110. The drive panel 114 may be rotated to a closed position, as shown in FIG. 1, wherein it constitutes a cover for about a third of a front opening 111 in housing 100. The drive panel 114 has four evenly spaced, rectangular drive bays 115A–D. In FIG. 1, bay 115A accommodates CD-ROM drive 166, bay 115B accommodates mini-disk drive 168, and bay 115C and bay 115D are illustrated as empty and are provided for drives or other devices which may be added later. Bays 115C and 115D are covered by blank panels 119, which snap into place. Such snap-in panels for blanking-off unused drive areas are well known in the art. Alternatively, blank panels could be integrally formed into drive panel 114 and defined by scored lines which can be punched out of drive panel 114 to accommodate drive accessories as needed. The drive panel 114 is maintained in its closed position by a latch 117, of any of several well known in the art, located in top panel 102.

A display support member 122 adjoins, and is perpendicular to, bottom panel 110 of the housing 100. This display support member extends from the right panel 106 to drive panel 114 when the latter is in its closed position. A flat panel display device 128, such as an LCD, active matrix display, plasma display, etc., is connected to, and rotates about, a piano hinge 124 located on the top edge 126 of display support member 122. The flat panel display device 128 may be rotated to a closed position, as shown in FIG. 1, wherein it constitutes a cover for the balance of the opening 111 in housing 100. When in the closed position the flat panel display device 128 extends past right panel 106 as shown in FIG. 2. Alternatively, flat panel display device 128 could extend no further than right panel 106. A larger flat panel display device 128 may be accommodated by removing a rectangular panel 103 from top panel 102 along score lines molded into top panel 102, as shown by dotted lines 105. As another alternative, flat panel display device 128 could be vertically hinged to right panel 106. A conventional latch 130, of a type well known in the art, is located in top panel 102. The latch 130 secures the flat panel display device 128 in the closed position by engaging tab 131 on the back of the flat panel display device 128. The flat panel display device 128 is connected to internal components of the computer by a flexible cable 138 emanating from harness 134, as show in FIG. 3.

Referring to FIG. 2, connectors 139 for peripherals and communication are located on the right panel 106. These connectors 139 pass through the right panel 106 and connect directly to appropriate leads and/or connectors of the motherboard 132 as well known in the art. Slots 141 for expansion cards are also located on the right panel 106. The slots 141 allow expansion cards to be inserted in the computer and connected to the motherboard 132. Expansion cards and the related slots 141 and connections to the motherboard 132 are well in the art. Power supply connections 143 are also located on the right panel 106 and connect directly to the power supply 136, again as well known in the art.

Figure 4:
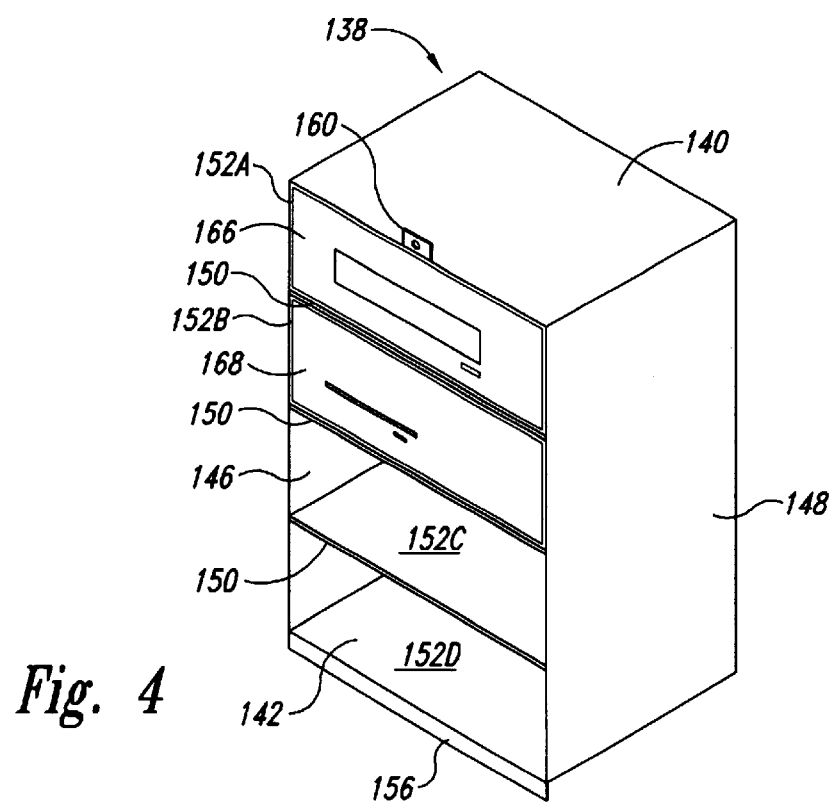
FIG. 4 is a front perspective view of a drive carriage of the FIG. 1 computer.

Referring to FIG. 4, a box-like drive carriage 138 is part of the drive unit 115 and has a rectangular top panel 140, rectangular bottom panel 142, rectangular back panel 144, rectangular left panel 146, and a rectangular right panel 148. Three horizontal dividers 150 are evenly spaced within the drive carriage 138, forming four cavities 152 A–D, open in the front, in the drive carriage 138. Four small openings 154 A–D are formed in the back panel of the drive carriage 138, one each for each cavity 152 A–D.

A tab 156 extends down from and across the fill width of the front edge 158 of bottom panel 142 of the drive carriage 138. A small tab 160 extends up from the top panel 140 of the drive carriage 138. As shown in FIG. 5, the wide tab 156 engages with a slot 162 integrally formed in the back of the drive panel 114 and small tab 160 engages a boss 161 integrally formed in the back of the drive panel 114 with a fastener 165, or alternatively a latch, typical to the art, to attach the drive carriage 138 to the drive panel 114. Drive carriage 138 may be disengaged from front panel 114 by unfastening fastener 165, and disengaging tab 156 from slot 162 by lifting drive carriage 138 up and away from drive panel 114. As shown in FIGS. 4 and 5, drive carriage 138 does not extend to the upper and lower limits of drive panel 114, to accommodate its fastening system as set forth above and to forestall interference with display support member 122 when the drive unit 115 is swung open.

Drive carriage 138 and drive panel 114 are dimensioned to accommodate drives of a standard size in a snug fit. For example, CD-ROM drive 166 is encased in cavity 152A of drive carriage 138.

Drives of various depths may be accommodated by a resilient spacer placed behind the drive. For example, mini-disk drive 168 is spaced from back panel 144 in cavity 152B by a foam spacer 171. Alternatively, drives may also be supported by integral tabs 181 cantilevered inwardly from sides 146 and 148 at the positions of horizontal dividers 150, as shown in FIG. 6.

A cable 174 from the harness 134 is passed through the opening 154A in the back of the drive carriage 138 and attached to the CD-ROM drive 166. Similarly, a cable 176 from the harness 134 is passed through opening 154B and attached to the mini-disk drive. The cable 176 to mini-disk drive 168 is also accommodated by an opening 180 in the foam spacer 171 that aligns with opening 154B of the drive carriage 138.

In operation, system unit 10 conveniently consolidates the CPU, memory, and other internal components of the computer with a flat panel display device 128, accessory drives 166, 168, and peripheral connectors 139 in a single housing 100 adjustably supported by pedestal mount 112. In this configuration, the system unit may be easily adjusted to facilitate viewing of the flat panel display device 128, the drives are easily accessed for adding and removing CDs and diskettes, and peripheral cables are hidden from view by the extension of the flat panel display device 128 past the right panel 106.

The flat panel display device 128 may be simply unlatched and rotated forward to provide ready access to the mother board 132, power unit 136, harness 134 and other internal parts of the computer. For instance, daughter cards, chips and the like located on the motherboard 132 can easily be accessed for installation and removal without the necessity of removing a cover with many cumbersome fasteners. The open flat panel display device 128 also provides easy access to the connectors 139 located on the right panel 106 and easy access to expansion cards loaded through the expansion card slots 141 located on the right panel 106. This access may be further accommodated by rotating and tilting the housing 100 on the pedestal mount 112.

With the flat panel display device 128 in its open position, drive panel 114 may also be rotated to its open position, providing ready access to the drive carriage 138. Drive assemblies, such as the CD-ROM drive 166, are accessed by unfastening the latch 165, and lifting the drive carriage 138 up and away from the drive panel 114.

The invention provides a consolidated desktop computer affording easy access to the internal components of the computer by hinging the flat panel display device 128 and disk drive unit 115 and using them as covers.

Variations of the disclosed embodiment and substitution of equivalent element and component will be readily apparent to those skilled in the art. For example, the positions of front panel 114 and flat panel display device 128 could be exchanged or otherwise modified, the connectors 139 could be provided elsewhere on the housing 100, the flat panel display device 128 need not be extended past the housing 100, hinges 116, 124 could be located in different places, etc.

Accordingly, it is to be understood that although the present invention has been described with reference to an exemplary embodiment, various modifications may be made without departing from the spirit or scope of the invention which is defined solely by the claims appended hereto.

What is claimed as new and desired to be protected by Letters Patent of the United States is:

1. A computer, comprising:
    a housing encasing operating components of said computer and having a motherboard located on a rear interior wall of said housing; and
    a flat panel display device pivotably connected to said housing and rotatable between a closed position defining at least a portion of a cover for said housing, and an open position providing access to said components of said computer located in said housing.
2. The computer of claim 1, wherein said display device comprises a liquid crystal display.
3. The computer of claim 1, wherein said display device comprises an active matrix display.
4. The computer of claim 1, wherein said display device comprises a plasma display.
5. The computer of claim 1, wherein said display device rotates about a horizontal axis.
6. The computer of claim 5, wherein said display device is mounted to said housing with a hinge.
7. The computer of claim 1, wherein said display device extends past at least one wall of said housing.
8. The computer of claim 1, wherein said display ends at each wall of said housing it reaches.
9. The computer claim 1, further comprising an adjustable pedestal mount for supporting said housing, said pedestal mount permitting rotation of said housing about a vertical axis and tilting movement of said housing.
10. The computer of claim 1, wherein said display device in said open position provides access to said motherboard.
11. A computer, comprising:
    a housing including operating components of said computer and having a motherboard located on a rear interior wall of said housing; and
    a drive unit pivotably connected to said housing and rotatable between a closed position defining at least a portion of a cover for said housing and an open position providing access to said components of said computer located in said housing.
12. The computer of claim 11, wherein said drive unit rotates about a vertical axis.
13. The computer of claim 12, wherein said drive unit is mounted to said housing with a hinge.
14. The computer of claim 11, wherein said drive unit in said open position provides access to said motherboard.
15. The computer of claim 11, wherein said drive unit comprises a front panel pivotally connected to said housing and a carriage containing at least one drive bay, said carriage being detachably attached to said front panel.
16. The computer of claim 15, wherein said carriage further comprises dividers and walls defining a plurality of drive bays which open towards said front panel.
17. The computer of claim 15, wherein said carriage further comprises members engageable with said front panel.
18. The computer of claim 17, wherein said members further comprise a first tab engageable with a slot in said front panel and a second tab engageable to said front panel.
19. The computer of claim 15, wherein said drive unit accommodates a plurality of drives, said drives being located in said at least one drive bay and fixed between said carriage and said front panel.
20. The computer of claim 19, wherein said drives are accessible through said front panel for loading and unloading storage media.
21. The computer of claim 19, wherein said carriage further comprises openings accommodating cables attachable to said drives.
22. The computer of claim 21, wherein said openings are contiguous with a back side of a drive and are opposite said front panel.
23. The computer of claim 19, further comprising resilient spacers provided between a back wall of a drive bay and a back side of a drive.
24. The computer of claim 23, wherein such resilient spacers are of plastic foam.
25. The computer of claim 23, wherein said resilient spacers have openings accommodating cables attached to said drives.
26. The computer of claim 19, further comprising tabs integral with said side walls for bearing against a back side of a drive.
27. A computer comprising:
    a housing including operating components of said computer and having a motherboard located on a rear interior wall of said housing;
    a flat panel display device; and
    a drive unit including a front panel and a carriage containing at least one drive bay;
    said display device and said drive unit being separately pivotably connected to said housing such that each is pivotable between a closed position where it defines at least a portion of a cover for said housing and an open position where it provides access to said components of said computer located in said housing.
28. The computer of claim 27, wherein said display device comprises a liquid crystal display.
29. The computer of claim 27, wherein said display device comprises an active matrix display.
30. The computer of claim 27, wherein said display device comprises a plasma display.
31. The computer of claim 27, wherein said display device rotates about a horizontal axis.
32. The computer of claim 31, wherein said display device is mounted to said housing with a hinge.
33. The computer of claim 27, wherein said display device extends past at least one wall of said housing.
34. The computer of claim 27, wherein said display ends at each wall of said housing it reaches.
35. The computer of claim 27, further comprising an adjustable pedestal mount for supporting said housing, said pedestal mount permitting rotation of said housing about a vertical axis and tilting movement of said housing.
36. The computer of claim 27, wherein said display device in said open position provides access to said motherboard.
37. The computer of claim 27, wherein said drive unit in said open position provides access to said motherboard.
38. The computer of claim 27, wherein said drive unit rotates about a vertical axis.
39. The computer of claim 38, wherein said drive unit is mounted to said housing with a hinge.
40. The computer of claim 27, wherein said drive unit comprises a front panel pivotally connected to said housing and a carriage containing at least one drive bay, said carriage being detachably attached to said front panel.
41. The computer of claim 40, wherein said carriage further comprises dividers and walls defining a plurality of drive bays which open towards said front panel.
42. The computer of claim 41, wherein said drive unit accommodates a plurality of drives, said drives being located in said at least one drive bay and fixed between said carriage and said front panel.

43. The computer of claim 42, wherein said drives are accessible through said front panel for loading and unloading storage media.

44. The computer of claim 42, wherein said carriage further comprises openings accommodating cables attachable to said drives.

45. The computer of claim 44, wherein said openings are contiguous with a back side of a drive and are opposite said front panel.

46. The computer of claim 42, further comprising resilient spacers provided between a back wall of a drive bay and a back side of a drive.

47. The computer of claim 46, wherein said resilient spacers are formed of a plastic foam.

48. The computer of claim 46, wherein said resilient spacers have openings accommodating cables attached to said drives.

49. The computer of claim 40, wherein said carriage further comprises members engageable with said front panel for holding said carriage to said front panel.

50. The computer of claim 49, wherein said members further comprise a first tab engageable with a slot in said front panel and a second tab engageable to said front panel.

51. The computer of claim 50, further comprising tabs integral with said side walls for bearing against a back side of a drive.

52. A computer comprising:
   a housing including operating components of said computer;
   a drive unit pivotably connected to said housing and rotatable between a closed position defining at least a portion of a cover for said housing and an open position providing access to said components of said computer located in said housing, wherein said drive unit comprises a front panel pivotally connected to said housing and a carriage containing at least one drive bay, said carriage being detachably attached to said front panel, and wherein said drive unit accommodates a plurality of drives, said drives being located in said at least one drive bay and fixed between said carriage and said front panel; and
   resilient spacers provided between a back wall of a drive bay and a back side of a drive.

53. The computer of claim 52, wherein such resilient spacers are of plastic foam.

54. The computer of claim 52, wherein said resilient spacers have openings accommodating cables attached to said drives.

55. A computer comprising:
   a housing including operating components of said computer;
   a drive unit pivotably connected to said housing and rotatable between a closed position defining at least a portion of a cover for said housing and an open position providing access to said components of said computer located in said housing, wherein said drive unit comprises a front panel pivotally connected to said housing and a carriage containing at least one drive bay, said carriage being detachably attached to said front panel, and wherein said drive unit accommodates a plurality of drives, said drives being located in said at least one drive bay and fixed between said carriage and said front panel; and
   tabs integral with said side walls for bearing against a back side of a drive.

56. A computer, comprising:
   a housing including operating components of said computer;
   a flat panel display device;
   a drive unit including a front panel pivotally connected to said housing and a carriage, said carriage being detachably attached to said front panel and further comprising dividers and walls defining a plurality of drive bays which open towards said front panel, and wherein said drive unit accommodates a plurality of drives, said drives being located in said drive bays and fixed between said carriage and said front panel; and
   resilient spacers provided between a back wall of a drive bay and a back side of a drive;
   said display device and said drive unit being separately pivotably connected to said housing such that each is pivotable between a closed position where it defines at least a portion of a cover for said housing and an open position where it provides access to said components of said computer located in said housing.

57. The computer of claim 56, wherein said resilient spacers are formed of a plastic foam.

58. The computer of claim 56, wherein said resilient spacers have openings accommodating cables attached to said drives.

59. A computer, comprising:
   a housing including operating components of said computer;
   a flat panel display device;
   a drive unit including a front panel pivotally connected to said housing and a carriage, said carriage containing at least one drive bay and being detachably attached to said front panel, said carriage further comprising members engageable with said front panel for holding said carriage to said front panel, said members further comprising a first tab engageable with a slot in said front panel and a second tab engageable to said front panel; and
   third tabs integral with side walls of the carriage for bearing against a back side of a drive;
   said display device and said drive unit being separately pivotably connected to said housing such that each is pivotable between a closed position where it defines at least a portion of a cover for said housing and an open position where it provides access to said components of said computer located in said housing.

* * * * *

UNITED STATES PATENT AND TRADEMARK OFFICE
CERTIFICATE OF CORRECTION

PATENT NO. : 6,359,775 B1
DATED : March 19, 2002
INVENTOR(S) : Revis

It is certified that error appears in the above-identified patent and that said Letters Patent is hereby corrected as shown below:

<u>Title page,</u>
Item [56], U.S. PATENT DOCUMENTS, insert -- 6,201,688   Leman   3/2001 --;
insert -- 6,266,235   Leman   7/2001 --;

<u>Column 3,</u>
Line 56, "fill" should be -- full --;

Signed and Sealed this

Twenty-ninth Day of April, 2003

JAMES E. ROGAN
*Director of the United States Patent and Trademark Office*